United States Patent [19]
Weidner et al.

[11] Patent Number: 5,987,572
[45] Date of Patent: Nov. 16, 1999

[54] METHOD AND APPARATUS EMPLOYING A DYNAMIC ENCRYPTION INTERFACE BETWEEN A PROCESSOR AND A MEMORY

[75] Inventors: Al Weidner, Tempe; Steve Gorman, Phoenix, both of Ariz.

[73] Assignee: Intel Corporation, Santa Clara, Calif.

[21] Appl. No.: 08/937,874

[22] Filed: Sep. 29, 1997

[51] Int. Cl.⁶ .................................................. H04L 9/00
[52] U.S. Cl. .................. 711/155; 711/133; 711/104; 711/105; 711/106; 713/200; 380/3; 380/4
[58] Field of Search ................ 380/3, 4, 42, 44; 326/8; 365/189.01, 230.01, 189.04, 195, 244; 711/155, 165, 104, 105, 106, 159, 163, 133, 134, 152, 154; 712/216, 220; 395/309, 392; 710/7, 20, 21, 52

[56] References Cited

U.S. PATENT DOCUMENTS

| | | | |
|---|---|---|---|
| 5,048,085 | 9/1991 | Abraham et al. | 380/23 |
| 5,563,945 | 10/1996 | Gercekci | 380/4 |
| 5,615,263 | 3/1997 | Takahashi | 380/4 |
| 5,657,466 | 8/1997 | Yazawa | 395/421.1 |
| 5,699,428 | 12/1997 | McDonnal | 380/4 |
| 5,737,575 | 4/1998 | Blaner | 395/491 |
| 5,745,497 | 4/1998 | Ben-Efraim et al. | 371/2.2 |
| 5,761,703 | 1/1998 | Bolyn | 711/106 |
| 5,768,372 | 6/1998 | Sung et al. | 380/3 |
| 5,796,825 | 8/1998 | McDonnal | 380/4 |
| 5,805,706 | 9/1998 | Davis | 380/49 |
| 5,825,878 | 10/1998 | Takahashi | 380/4 |
| 5,873,104 | 2/1999 | Tremblay | 707/206 |

*Primary Examiner*—Tod R. Swann
*Assistant Examiner*—Paul E. Callahan
*Attorney, Agent, or Firm*—Blakely, Sokoloff, Taylor & Zafman LLP

[57] ABSTRACT

A method and apparatus employing a dynamic encryption interface between a processor and a memory. The interface of the present invention dynamically encrypts the contents of the memory. A determination is made whether a memory access request is active. If yes, a further determination is made whether the address associated with the memory access request is greater than a POINTER. If yes, encrypting or decrypting the memory access using a first key. If no, encrypting or decrypting the memory access using a second key. Processing then proceeds to the decision block that determines whether or not the memory access request is active. If the memory access request is not active, data is read from a memory location identified by the POINTER. The read data is decrypted using the first key. The data is encrypted using the second key. The encrypted data is written back to the memory location point identified by the POINTER.

20 Claims, 3 Drawing Sheets

5,987,572

METHOD AND APPARATUS EMPLOYING A DYNAMIC ENCRYPTION INTERFACE BETWEEN A PROCESSOR AND A MEMORY

BACKGROUND OF THE INVENTION

1. Technical Field

The present invention relates generally to secure processing and in particular to a method and apparatus employing a dynamic encryption interface between a processor and a memory.

2. Background Art

In the area of secure processing, it is important to protect the system from outside threats such as a "record and decode" threat and a "record and playback" threat. The "record and decode" threat occurs when an interloper decodes sensitive information by watching and recording a transaction that occurs on a pin of an integrated circuit (e.g., a microprocessor integrated circuit). The "record and playback" threat occurs when an interloper attempts to repeat a transaction by recording the transaction and playing the transaction back to the device (e.g., the microprocessor integrated circuit).

For example, with the advent of electronic cash that is stored in "smart cards", an interloper can record a "deposit" transaction and, without any knowledge of exactly what the encoded sequence means, could replay this "deposit" transaction back to the smart card. If someone observed a transaction involving $X and one involving $Y, the interloper can replay the transaction by changing only the dollar amount and tamper with the balance in his account or another's account.

Conventional schemes of encrypting data between a processor and a memory provide protection against some threats but not against others. For example, one approach to protect against security threats is to employ physical protection to prevent access to the pins of the device. Consider a system having a first device and a second device that are each packaged in its own package. In order to protect the interface between the first device and the second device, this conventional approach encapsulates the first and second devices so that the interface between the first device and the second device is not accessible to an interloper.

This approach suffers from several disadvantages. First, the cost to encapsulate the first and second device is high due to the packaging materials employed and the labor involved in encapsulating the first device and the second device. Second, this approach precludes the use of standard devices in systems. Since the interface between the devices is hidden from view, standard pin-outs are unavailable, precluding a system integrator from sourcing the first or second device from different manufacturers.

A second approach to reduce security threats is to encrypt data that is being communicated between the first device and the second device. Conventional encryption schemes suffer from several disadvantages. First, conventional encryption schemes require non-standard encryption synchronization and logic in both the first device and the second device. This additional and non-standard logic in the first and second device increases the cost of the system and further delays the access time to the second device by the first device. Second, as with the first approach, conventional encryption precludes the use of standard devices since the manufacturer of the first device and the manufacturer of the second device must agree a priori the encryption and synchronization protocol between the first and second device. Third, although this approach reduces the exposure to the record and decode threat, this approach does not address the record and playback threat.

In general, the conventional encryption schemes make it difficult for memory data to be observed and understood, but do not protect the system from being tampered with. Specifically, the conventional schemes fail to protect a system from the "record and playback" threat.

Accordingly, there remains a need for an improved interface between a processor and a memory that protects data communicated between the processor and the memory from the above-noted threats.

SUMMARY OF THE INVENTION

A method and apparatus employing a dynamic encryption interface between a processor and a memory. The interface of the present invention dynamically encrypts the contents of the memory. A determination is made whether a memory access request is active. If yes, a further determination is made whether the address associated with the memory access request is greater than a POINTER. If yes, encrypting or decrypting the memory access using a first key. If no, encrypting or decrypting the memory access using a second key. A further determination is made to determine whether or not the memory access request is active. If the memory access request is not active, data is read from a memory location identified by the POINTER. The read data is decrypted using the first key. The data is encrypted using the second key. The encrypted data is written back to the memory location point identified by the POINTER.

BRIEF DESCRIPTION OF THE DRAWINGS

The objects, features and advantages of the method and apparatus for the present invention will be apparent from the following description in which.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams. Depending upon the implementation, the corresponding apparatus element may be configured in hardware, software, firmware or combinations thereof.

The method and apparatus employing a dynamic encryption interface between a processor and a memory finds many applications in wide technological fields. For example, any application that requires a secure processing environment can benefit from the present invention. This invention can be implemented in such secure processing systems which include, but are not limited to, smart cards with the advent of cybercash, ATM machines, point of sale (POS) terminals, which are commonly found in grocery stores, credit card processing systems, and secure transaction terminals, such as those employed in banks and other commercial institutions.

Because the present invention continuously re-encrypts the data with a randomly changing key, the record and playback threat and the record and decode threat are both minimized. Moreover, because the dynamic encryption interface of the present invention, is invisible to the processor, the memory device, and to any software executing on the processor, any standard off-the-shelf memory device can be configured with the present invention without additional hardware and extensive modification.

Figure 1:
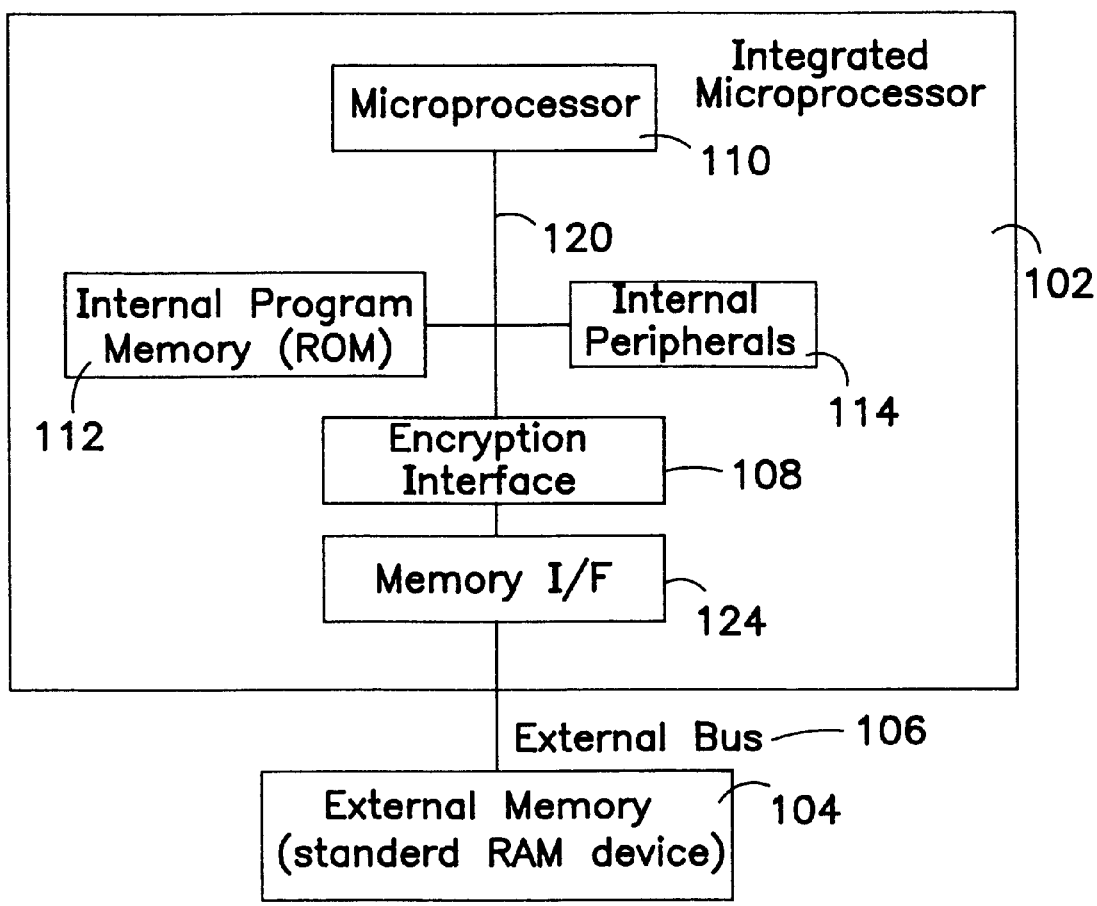
FIG. 1 illustrates a computer system in which which one embodiment of the dynamic encryption interface of the present invention can be implemented.

FIG. 1 illustrates a computer system 100 in which the dynamic encryption interface 108 of the present invention can be implemented. Computer system 100 includes a microprocessor integrated circuit package 102 coupled to a memory subsystem 104 via an external bus 106. The microprocessor integrated circuit package 102 includes a microprocessor 110, internal program memory 112, internal peripherals 114 and a dynamic encryption interface 108 of the present invention coupled together via an internal processor bus 120.

The microprocessor integrated circuit package 102 also includes a memory interface 124 for controlling access to the memory subsystem 104. The memory subsystem 104 includes an external memory that can be a standard random access memory (RAM) device. For example, the external memory can be a dynamic random access memory (DRAM) or a static random access memory (SRAM).

As will be understood by those skilled in the art, the memory interface 124 is configured in such a way as to control the specific type of external memory 104. Since the timing, control signals and protocols employed by the different memory devices, set forth earlier, are well known in the art, the memory interface 124 is not discussed further herein.

The internal memory 112 (commonly referred to as read only memory (ROM)) can store programs such as microcode. The internal peripherals 114 can include devices such as timers, interrupt controllers, as well as serial and parallel interface ports.

Since the microprocessor integrated circuit package 102 and the memory subsystem package 104 are each encapsulated in a package, an interloper can only access the external bus 106 to perform the record and decode and the record and playback threats.

The dynamic encryption interface 108 is coupled to communicate information between the internal microprocessor bus 120 and the memory interface 124. The dynamic encryption interface 108 automatically and continuously re-encrypts the entire content of the memory subsystem. The dynamic encryption interface 108 includes a key generator to generate a plurality of keys that are employed to encrypt the memory contents. These keys are dynamically changed when the entire contents of the memory have been encrypted by the present key (i.e., a new key is employed for each pass through the memory array).

The dynamic encryption interface 108 is transparent to the processor, to software executing on the processor, and to the memory.

Since the dynamic encryption interface 108 automatically and continuously re-encrypts the entire contents of the memory subsystem 104, at any one time, different sections of the memory can be encrypted with a different key. In particular, a first section can be encrypted by a first key (KEY(n)) and a second section can be encrypted by a new key (KEY(n+1)). Accordingly, the dynamic encryption interface 108 maintains a memory address pointer (hereinafter referred to as POINTER) that tracks which portions of the memory have been encrypted by the first key (KEY(n)) and the sections of memory encrypted by the second key (KEY(n+1)).

Figure 2:
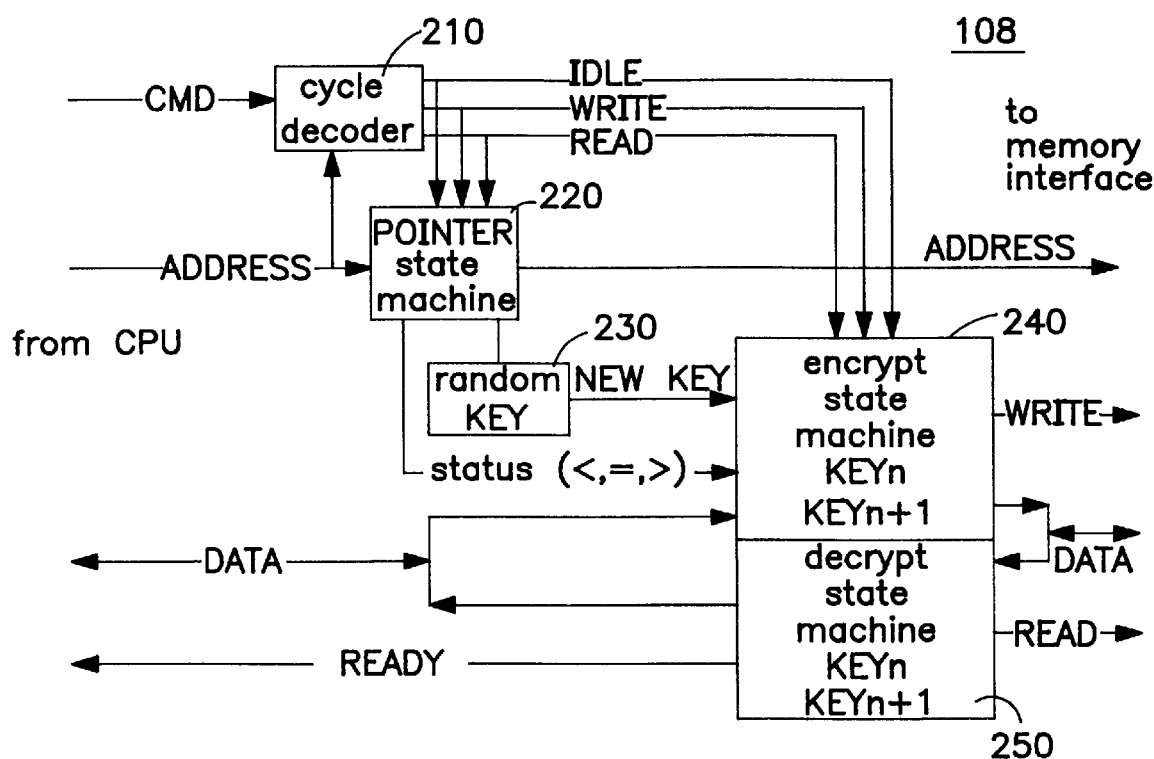
FIG. 2 illustrates a simplified block diagram for the dynamic encryption interface configured in accordance with one embodiment of the present invention.

FIG. 2 illustrates a simplified block diagram of the dynamic encryption interface 108 configured in accordance with one embodiment of the present invention. The dynamic encryption interface 108 includes a cycle decoder 210, POINTER state machine 220, a random KEY generator 230, an encrypt state machine 240 and a decrypt state machine 250. Each of these circuits will be described in greater detail hereinafter.

Cycle Decoder

Cycle decoder 210 includes an input for receiving a command and address from the internal microprocessor bus 120. Responsive to the command (CMD) and address signals, the cycle decoder 210 selectively generates an IDLE signal, a WRITE signal, or a READ signal. These signals are provided to the POINTER state machine 220 and the encrypt state machine 240 and the decrypt state machine 250. An IDLE signal indicates that no requests from the microprocessor 110 are pending. A WRITE signal indicates that the microprocessor 110 is requesting a WRITE operation. Similarly, a READ signal indicates that the microprocessor 110 is requesting a READ operation. In summary, the cycle decoder 210 decodes the cycles on the internal microprocessor bus 120 and determines when and if the microprocessor 110 is requesting any access from an external memory subsystem 104. The cycle decoder 210 generates status signals (the IDLE signal, the WRITE signal, and the READ signal) to the POINTER state machine 220 and the encrypt state machine 240 and the decrypt state machine 250.

POINTER State Machine

The POINTER state machine 220 includes a pointer register and comparators that perform the following:

compare the POINTER to the address for READ and WRITE cycles; and compare the POINTER to the top of memory.

For READ and WRITE cycles, the POINTER state machine 220 indicates whether the address on the internal processor bus 120 is "greater than", "equal to" or "less than" the value of the POINTER via status signals. The status signals are provided to the encrypt state machine 240 and the decrypt state machine 250. The encrypt and decrypt state machines employ the status signals to determine which key (KEY(n)) or (KEY(n+1)) is to be employed for the memory access. The POINTER state machine 224 also passes the address to the memory interface 124 for the READ and WRITE cycles.

For IDLE cycles, the POINTER state machine 220 provides the POINTER value to the memory interface 124 for the continuous encryption function of the present invention.

The POINTER state machine 220 also includes logic to perform the following:

increment the POINTER after each re-encryption;

compare the POINTER to the top of memory;

reload the POINTER register with the bottom of memory when the top of memory limit has been reached;

indicate that a new key should be generated; and indicate that the KEY (n) should be replaced with KEY (n+1); and the KEY (n+1) is to be replaced with a new key.

Random Key Generator

Random Key Generator 230 generates new keys and provides the new key to the encrypt state machine 240 and the decrypt state machine 250. In one embodiment, the Random Key Generator 230 is implemented with an asynchronous ring counter having an input for receiving an asynchronous clock signal. The number of bits in the output of the asynchronous ring counter can be selected to match the data width of the information communicated between the integrated processor 102 and the external memory subsystem 104.

Encrypt State Machine 240

During WRITE cycles, the encrypt state machine 240 encrypts the data from the processor 110 by employing KEY(n) or KEY(n+1) based on the status signals generated by the POINTER state machine. The encrypt state machine 240 forwards the encrypted data to the memory interface 124 to be written to the external memory device 104.

The decrypt state machine 250 decrypts the data being read from the memory via the memory interface 124 by employing KEY(n) or KEY(n+1) based on the status signals provided by the POINTER state machine 220. During WRITE cycles, the decrypt state machine 250 forwards the decrypted data (i.e., plaintext) to the processor 110.

During IDLE cycles, the decrypt state machine 250 decrypts the data being read from the memory via the memory interface 124 using KEY(n) and passes the plaintext to the encrypt state machine 240. The encrypt state machine 240 re-encrypts the data using KEY(n+1) and writes the re-encrypted data back to the external memory 104 via the memory interface 124. The encrypt state machine 240 and the decrypt state machine 250 also include logic to update the internally stored keys by:

replacing KEY(n) with the value of KEY(n+1); and
replacing KEY(n+1) with KEY(n).

In one embodiment of the present invention, the encryption is performed by an exclusive OR (XOR) logical operation on the data and the random key. Since the XOR logical function is symmetric, decryption of the encrypted data is also accomplished by the XOR logical operation between the encrypted data and the random key. It will be understood by those of ordinary skill in the art that other encryption/decryption schemes can be selected to encrypt and decrypt the data. If a non-symmetric logical function is employed to encrypt the data, a dual of that logical function is employed to decrypt the encrypted data.

The encrypt state machine 240 and the decrypt state machine 250 generate a ready signal to the microprocessor 110 to indicate completion of a WRITE operation and a READ operation.

Figure 3:
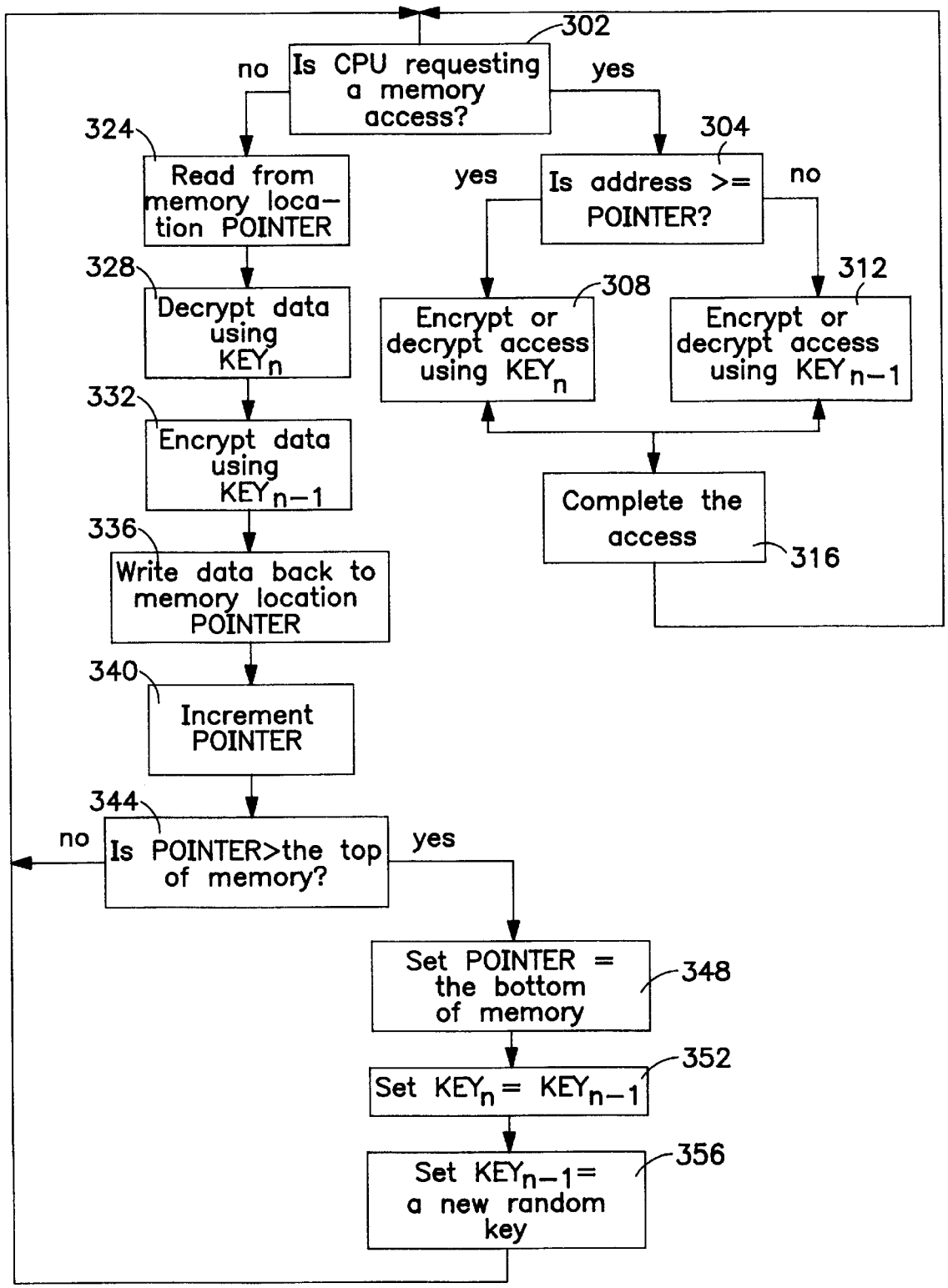
FIG. 3 is a flowchart illustrating the processing steps performed by one embodiment of the dynamic encryption interface of the present invention.

FIG. 3 is a flowchart illustrating the processing steps performed by the dynamic encryption interface 108 the present invention. In decision block 302, a determination is made whether the processor is requesting a memory access. If yes, in decision block 304, a determination is made whether the address is greater than the POINTER. If yes, in processing step 308, the memory access is encrypted or decrypted using KEY(n). If no, in processing step 312, the memory access is encrypted or decrypted using KEY(n+1). If a write operation is requested, the plain text data is encrypted. If a read operation is requested, the encrypted data is decrypted to recover the plain text data. In processing step 316, memory access is completed. Processing then proceeds to decision block 302.

If the determination in decision block 302 is no, in processing step 324, a read operation is performed on a memory location specified by the POINTER. In processing step 328, the read data is decrypted using KEY(n). In processing step 332, the decrypted data is encrypted using KEY(n+1). In processing step 336, the data is written back to a memory location identified by POINTER.

In processing step 340, the POINTER is incremented. In decision block 344, a determination is made whether the POINTER is greater than the top of memory. If no, processing proceeds to decision block 302. If yes, in processing step 348, POINTER is assigned the bottom of memory. In processing step 352, KEY(n) is assigned the value of KEY(n+1). In processing step 356, the KEY(n+1) is assigned a new random key value. After processing step 356, the processing proceeds to decision block 302.

In one embodiment, it is important that the dynamic encryption interface of the present invention is integrated with the device (e.g., an embedded processor) and that the dynamic encryption interface is transparent to the memory, software and the processor.

The dynamic encryption interface 108 of the present invention overcomes the disadvantages discussed previously in the Background by making the observable encoded sequences on the external bus 106 different at different points in time for the identical internal sequence. Since the dynamic encryption interface 108 of the present invention continuously and automatically encrypts the entire contents of the external memory subsystem 104 with ever changing random keys, the identical internal sequence appears differently on the external bus 106. Furthermore, the dynamic encryption interface 108 supports the use of standard memory devices with out additional synchronization and encryption logic in the memory device. Consequently, a system integrator can employ standard off-the-shelf memory devices in a system while addressing the "record and playback" security threat.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

We claim:

1. In a system having a memory, said memory having contents, a method for dynamically encrypting the contents comprising the steps of:
    a) determining if a memory access request is active;
    b) if yes, determining if an address associated with the memory access request is greater than a POINTER;
        if yes, encrypting or decrypting the memory access using a first key;
        if no, encrypting or decrypting the memory access using a second key;
    c) if the memory access request is not active, reading from a memory location identified by the POINTER;
    d) decrypting the read data by using a first key;
    e) encrypting the data by using a second key; and
    f) writing the encrypted data to a memory location identified by the POINTER.

2. In a system having a memory, said memory having contents, a method for dynamically encrypting the contents comprising the steps of:
    a) receiving an IDLE signal;
    b) determining if the IDLE signal is asserted;
    c) if yes, re-encrypting the contents of the memory indicated by a POINTER signal;
        else, determining if a READ/WRITE signal has been asserted;

if yes, reading the contents of memory as specified by the address by employing a first key or a second key based on a POINTER signal, else, employing a first key or a second key to encrypt data based on the POINTER signal, and writing the encrypted data to the memory.

3. The method of claim 2 wherein the step of re-encrypting the contents of the memory indicated by the POINTER signal includes the step of:

determining if the POINTER signal is in a first logical relationship with a predetermined memory address, if yes, generating a new random key for the re-encryption process.

4. A dynamic encryption interface disposed between a processor and a memory device, said memory device having contents comprising:

a) a cycle decoder;

b) a POINTER state machine, coupled to the cycle decoder; and c) an encryption/decryption state machine, coupled to the POINTER state machine and the cycle decoder, said encryption/decryption state machine configured for continuously re-encrypting the contents of the memory device.

5. The dynamic encryption interface of claim 4 wherein the cycle decoder receives a command signal and an address signal and responsive thereto generates an IDLE signal and a READ/WRITE signal;

wherein the POINTER state machine receives the address signal, the IDLE signal and the READ/WRITE signal and responsive thereto selectively generates a STATUS signal and maintains the address signal;

wherein the encryption/decryption state machine receives the IDLE signal, the READ/WRITE signal, a random key, the STATUS signal, and a DATA signal, said encryption/decryption state machine continuously re-encrypting the contents of the memory with a current random key when the IDLE signal is asserted.

6. The dynamic encryption interface of claim 4 wherein the encryption/decryption state machine encrypts data to be written by employing one of a first random key and a second random key based on the POINTER signal when the IDLE signal is deasserted and the READ/WRITE signal is deasserted.

7. The dynamic encryption interface of claim 4 wherein the encryption/decryption state machine decrypts encrypted data read from the memory by employing one of a first random key and a second random key based on the POINTER signal when the IDLE signal is deasserted and the READ/WRITE signal is asserted.

8. The dynamic encryption interface of claim 4 wherein the pointer state machine includes a counter for managing the POINTER signal.

9. The dynamic encryption interface of claim 4 further comprising a random key generator for providing the first and second random keys to encryption/decryption state machine.

10. The dynamic encryption interface of claim 4 wherein the encryption/decryption state machine changes a current random key to a new random key for every pass through the memory device and stores the new random key.

11. The method of claim 1, further comprising:

a) incrementing the POINTER;

b) determining if the POINTER is greater than a first predetermined address;

c) if no, returning to processing step a) of claim 1;

d) if yes, assigning the POINTER with a second predetermined memory address;

e) assigning the first key with the second key;

f) assigning the second key with a new random key; and g) proceeding to processing step a) of claim 1.

12. A processor package adapted to be coupled to a standard memory, said processor package comprising:

a) a dynamic encryption interface for interfacing with memory, said dynamic encryption interface including i) a cycle decoder;

ii) a POINTER state machine, coupled to the cycle decoder; and iii) an encryption/decryption state machine, coupled to the POINTER state machine and the cycle decoder, said encryption/decryption state machine configured for continuously re-encrypting the contents of the memory device.

13. The processor package of claim 12 wherein the cycle decoder receives a command signal and an address signal and responsive thereto generates an IDLE signal and a READ/WRITE signal;

wherein the POINTER state machine receives the ADDRESS signal, the IDLE signal and the READ/WRITE signal and responsive thereto selectively generates a STATUS signal and maintains the address signal;

wherein the encryption/decryption state machine receives the IDLE signal, the READ/WRITE signal, a random key, the STATUS signal, and a DATA signal, said encryption/decryption state machine continuously re-encrypting the contents of the memory with a current random key when the IDLE signal is asserted.

14. The processor package of claim 12 wherein the encryption/decryption state machine encrypts data to be written by employing one of a first random key and a second random key based on the POINTER signal when the IDLE signal is deasserted and the READ/WRITE signal is deasserted.

15. The processor package of claim 12 wherein the encryption/decryption state machine decrypts encrypted data read from the memory by employing one of a first random key and a second random key based on the POINTER signal when the IDLE signal is deasserted and the READ/WRITE signal is asserted.

16. A processing system comprising:

a) a memory;

b) an external bus coupled to the memory;

c) a processor package, coupled to the external bus, said processor package having a dynamic encryption interface, said dynamic encryption interface including i) a cycle decoder;

ii) a POINTER state machine, coupled to the cycle decoder; and iii) an encryption/decryption state machine, coupled to the POINTER state machine and the cycle decoder, said encryption/decryption state machine configured for continuously re-encrypting the contents of the memory device.

17. The processing system of claim 16 wherein the cycle decoder receives a command signal and an address signal and responsive thereto generates an IDLE signal and a READ/WRITE signal;

wherein the POINTER state machine receives the ADDRESS signal, the IDLE signal and the READ/WRITE signal and responsive thereto selectively generates a STATUS signal and maintains the address signal;

wherein the encryption/decryption state machine receives the IDLE signal, the READ/WRITE signal, a random key, the STATUS signal, and a DATA signal, said encryption/decryption state machine continuously re-encrypting the contents of the memory with a current random key when the IDLE signal is asserted.

18. The processing system of claim 16 wherein the encryption/decryption state machine encrypts data to be written by employing one of a first random key and a second random key based on the POINTER signal when the IDLE signal is deasserted and the READ/WRITE signal is deasserted.

19. The processing system of claim 16 wherein the encryption/decryption state machine decrypts encrypted data read from the memory by employing one of a first random key and a second random key based on the POINTER signal when the IDLE signal is deasserted and the READ/WRITE signal is asserted.

20. The processing system of claim 16 wherein the processing system is a smart card.

* * * * *